United States Patent

Wunsch

[11] Patent Number: 5,364,111
[45] Date of Patent: Nov. 15, 1994

[54] SEALING ARRANGEMENT

[76] Inventor: Eckart Wunsch, Buchenstrasse 5, D-Schomberg-Langenbrand, Germany

[21] Appl. No.: 935,559

[22] Filed: Aug. 26, 1992

[51] Int. Cl.$^5$ ............................................. F16J 15/32
[52] U.S. Cl. ................................. 277/117; 277/115; 277/121; 277/205
[58] Field of Search .............. 277/27, 106, 115, 116.6, 277/117, 121, 124, 142, 143, 144, 205

[56] References Cited

U.S. PATENT DOCUMENTS

| | | | |
|---|---|---|---|
| 2,093,572 | 9/1937 | Padgett | 277/117 |
| 2,204,915 | 6/1940 | Sharp | 277/117 |
| 2,489,191 | 11/1949 | Looke | 277/115 |
| 2,827,314 | 3/1958 | Granberg et al. | 277/117 |
| 2,880,022 | 3/1959 | Schultze | 277/115 |
| 3,467,357 | 9/1969 | Schomer et al. | 277/115 |
| 3,630,531 | 12/1971 | Bondi | 277/117 |
| 4,251,081 | 2/1981 | Skoog | 277/115 X |
| 4,352,368 | 10/1982 | Landgarten | 277/205 X |
| 4,643,440 | 2/1987 | Massey, Jr. | 277/117 |

FOREIGN PATENT DOCUMENTS

| | | |
|---|---|---|
| 1279292 | 11/1961 | France . |
| 7130258 | 3/1972 | France . |
| 206141 | 10/1923 | United Kingdom . |

Primary Examiner—William A. Cuchlinski, Jr.
Assistant Examiner—John L. Beres
Attorney, Agent, or Firm—Wood, Herron & Evans

[57] ABSTRACT

Proposed is a sealing arrangement for shafts with very small diameters, with an essentially U-shaped lip seal (6) subjected to the force of an axially acting helical compression spring (9). The two sealing lips (6.1 and 6.2) of the lip seal (6) are by thrust parts (8) with working surfaces (8.1) of wedge-shaped arrangement spread apart in such a way that the radially inner sealing lip (6.1) is pressed tightly on the shaft outside circumference and the radially outer sealing lip (6.2), independently thereof, tightly on a housing wall (5).

11 Claims, 2 Drawing Sheets

SEALING ARRANGEMENT

BACKGROUND OF THE INVENTION

The invention concerns a sealing arrangement for shafts with small diameters within or bordering on housings containing mediums, where a lip seal is loaded by an axially acting spring.

The general prior art includes axial face seals for centrifugal pumps. The characteristic of this type of seal is that the moving sealing surface which is subject to wear has been relocated away from the shaft surface into a surface perpendicular to the shaft axis. The actual seal is established between the surfaces of a fixed ring and a rotating sliding ring. The latter is axially acted upon by a spring force. A fixed-body contact exists during operation between the sliding surfaces, so that a gap is no longer present (refer to Dubbel, pp. 197, 198 "Gleitringdichtungen" [axial face seals]).

Also known from the prior art is loading the seal by means of a worm spring in order to thereby obtain the necessary contact pressure for the desired seal. But it has been demonstrated that inserting such a worm spring is for space reasons not possible with very small shaft diameters.

Exactly with very small shaft diameters and high shaft peripheral speeds along with high liquid or gas pressures it was heretofore considered as impossible that with high peripheral speeds of the shaft to be sealed and with high pressures an effective sealing arrangement could be employed. The illustrated operating conditions regularly led to a relatively quick aging of the seals employed, whereby their resilience was lost, particularly at the seal lips. The result was leakages and liquid penetration at the transmission parts and engines connected to the shafts.

The problem underlying the invention is to provide a sealing arrangement for shafts with small diameters of the initially named type, which arrangement is simple in its entire structure, additionally allows a simple assembly and assures an optimum effect also over a long period of time while avoiding the disadvantages of the said prior art.

SUMMARY OF THE INVENTION

This problem is inventionally solved in that the seal lips of the lip seal are separated by wedge-shaped working surfaces of axially effective thrust parts and, independently from one another, are radially spread in such a way that at least the radially inner seal lip bears tightly on the shaft under pressure. Essential is that the working surfaces bear in line fashion on the end sections of the inside edges of the sealing lips of the lip seal.

With this form of a sealing arrangement, the two opposed sealing lips of the U-shaped lip seal are through the action of a thrust part spread in a fashion such that at least the one sealing lip bears in sealing fashion, tightly, on the shaft rotating at high peripheral speeds. The opposite sealing lip is selectively tightly forced on the housing wall. The contact force of the thrust part is achieved essentially by the helical compression spring used and a possibly pressurized liquid or air, respectively a gas. To keep the friction losses stemming from the contact of the wedge-shaped working surfaces as low as possible, the working surfaces of the thrust part bear essentially in line fashion on the inside edges of the sealing lips of the lip seal.

To obtain the line contact of the working surfaces on the inside edges of the sealing lips, the working surfaces may be inclined to the longitudinal axis of the shaft at a greater angle than the end areas of the inside edges of the sealing lips of the lip seal which bear on the working surfaces. These latter may be inclined at an angle of about 45° to the longitudinal axis of the shaft, while the end areas are inclined at an angle of about 30° to the longitudinal axis of the shaft. This assures that the seal is established only by the outermost edge of the sealing lip, whereby a greater friction on the shaft is avoided.

The line contact between the working surfaces of the thrust part and the sealing lips of the lip seal may be established also by two or more springs arranged successively and extending annularly around the inside edges of the sealing lips of the lip seal.

An essential characteristic of the invention is that the outer and inner sealing lips are pushed down separately from each other. Experiments have shown that forcing the two sealing lips down simultaneously by a single thrust part is practically impossible, since the necessary close tolerances cannot be maintained with the very small shaft diameters, if an economical production in series is presupposed. In the tests it was shown that, when using a single thrust part, for instance the one sealing lip was forced down, whereas the second sealing lip allowed liquid to pass, since the pressure was insufficient.

The experiences gathered in the sealing system relate primarily to teflon as sealing material, which has no elasticity.

A considerable difference between the radially outer and inner sealing lips is constituted also in that the outer sealing lip can be forced firmly on the inside wall of the bore (of the housing), whereas the inner sealing lip is forced down moderately, for instance at a pressure of 100 grams, in order to keep the friction with the rapidly rotating shaft low and thus also reduce the necessary energy, respectively the power consumption of the drive motor.

In the embodiment of the invention, the headside working surfaces may be formed on a single thrust part acted upon by a helical spring. On the other hand, the working surfaces acting on the radially outer sealing lip of the lip seal may be formed by a housing shoulder while the second working surface, on the head side, is provided on a thrust part loaded by a compression spring.

In yet another embodiment of the invention, the working surface acting on the radially outer sealing lip of the lip seal may be formed by a cylinder ring on the housing wall, while the second working surface, on the head side, is provided on a compression spring-loaded thrust part.

These aforementioned embodiments mean that selectively a single thrust part may be provided as a ring which extends around the shaft and features on the head side the wedge-shaped working surfaces which spread the sealing lips of the lip seal apart. On the other hand, though, it is also possible to fashion a thrust part, e.g., as a cylinder ring which bears on the inside wall of the housing, or bore, and features on the head side a working surface which forces the radially outer sealing lip on the housing wall. The radially inner sealing lip is forced on the shaft by a thrust part, under spring load. This means that only the inner thrust part is axially movable, whereas the cylinder ring stands firmly on the bottom of the housing shoulder. As an alternative to it, the radially outer cylinder ring itself may be fashioned also by the housing wall, in that a working surface of wedge shape is machined there, which forces the radially outer sealing lip of the lip seal on the housing wall.

The sealing ring may favorably be made of a PTFE material. But it may also be made of Viton, neoprene, Buna or polyamide. The housing may consist of both metal and plastic.

BRIEF DESCRIPTION OF THE DRAWINGS

An embodiment of the invention is illustrated in the drawing, showing in

DESCRIPTION OF THE PREFERRED EMBODIMENTS

Figure 1:
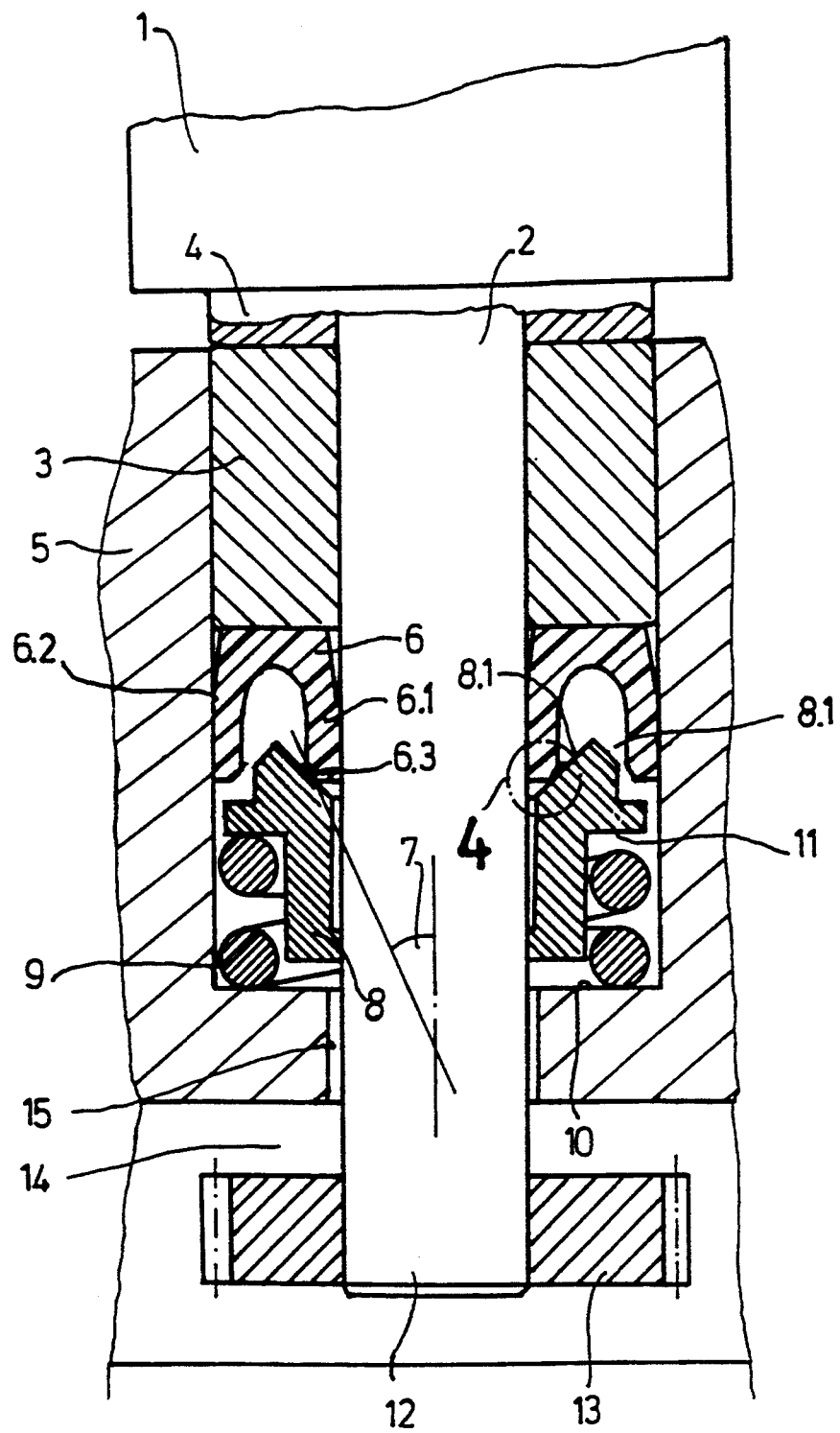
FIG. 1, the sealing arrangement in half section on the example of a gear pump powered by an electric motor.

In the example of FIG. 1, an electric motor 1 drives a shaft 2. The shaft 2 has a very small diameter, for instance of 2.5 mm, and a high speed of rotation, respectively peripheral speed. The shaft 2 is mounted in a plain bearing 3, which on the motor side butts axially on the motor flange 4. Of course, also antifriction bearings are usable. The outer shell surface of the bearing 3 is in contact with the inside wall of the housing 5, or bore. Contained in the axial extension of the bearing 3 is a sealing ring 6 representing a lip seal of plastic, preferably of PTFE. The lip seal 6 is essentially U-shaped and bears with its radially inner sealing lip 6.1 on the outer circumference of the shaft 2. The radially outer sealing lip 6.2 bears on the inside wall of the housing 5. The end section of the inside edges 6.3 of the sealing lips 6.1 and 6.2 is at an angle 7 of about 30° so inclined that the two opposed inside edges 6.3 inscribe an angle of about 60°.

U-shaped in cross section, the lip seal 6 is engaged at its open U, axially, by a thrust part 8 which is of ring-shaped design and arranged around the shaft 2. On the head side, the thrust part 8 features working surfaces 8.1 extending wedge-shaped at an angle of about 45°. The thrust part 8 is acted upon by a helical compression spring 9 which, for one, bears on the housing bottom 10 and, for another, on an annular shoulder 11 beneath the working surfaces 8.1 of the thrust part 8. Thus, the thrust part is subjected to a force acting axially in the direction on the lip seal 6, whereby the working surface 8.1 of the thrust part 8 bears on the inside edges 6.3 of the sealing lips 6.1. Due to the different angles of the working surfaces 8.1 and the inside edges 6.3 of the lip seal 6, an essentially line-shaped contact is brought about between the seal 6 and the thrust part 8. Inclined at an angle, the working surfaces force the sealing lip 6.1 firmly and tightly on the outside circumference of the shaft. The tight contact of the lip seal 6 is assured nearly without limitation by the thrust part 8. The outer sealing lip 6.2 is forced on the inside wall of the housing 5, for instance by the liquid pressure or by gas pressure.

Provided on the end 12 of the shaft 2 is a gear 13 meshing with a not illustrated second gear and forming thereby, e.g., a gear pump. Filled with a liquid medium in the case of a gear pump, the space 14 is pressurized by the liquid, which through the annular gap 15 of the housing 5 prevails also on the thrust part 8 and acts in the direction toward the lip seal 6. The liquid pressure can quite possible amplify also the axial force of the helical spring 9, so that the working surfaces 8.1 of the thrust part 8 will always remain in firm contact with the inside edges 6.3 of the lip seal 6. This type of sealing arrangement prevents in a technically simple manner and with an optimum design a penetration of the liquid from the liquid space 14 to the bearing 3, or motor 1.

Instead of the presented example of a motor-powered gear pump for liquid mediums, of course, it is also conceivable to use this sealing arrangement in spaces carrying gas or air pressure.

The housing 5 can selectively be fashioned of plastic or metal. Using a metal housing 5 provides the option of using according to FIG. 2 a cylinder ring 16 which firmly stands on the housing bottom 10 while on the head side it possesses a working surface 16.1 extending at an angle of about 45°. This working surface 16.1 is in connection with the inside edge 6.3 of the radially outer sealing lip 6.2 of the lip seal 6, forcing the sealing lip 6.2 on the inside wall of the housing 5. The thrust part 8, subjected again to the force of a helical compression spring 9 acting axially, features working surfaces 8.1 on the head side. In this case of the example illustrated in FIG. 2 though, only the radially inner working surface 8.1 bears on the inside edge 6.3 of the radially inner sealing lip 6.1 of the lip seal 6, forcing this sealing lip 6.1 tightly on the outer circumference of the shaft 2.

Figure 2:
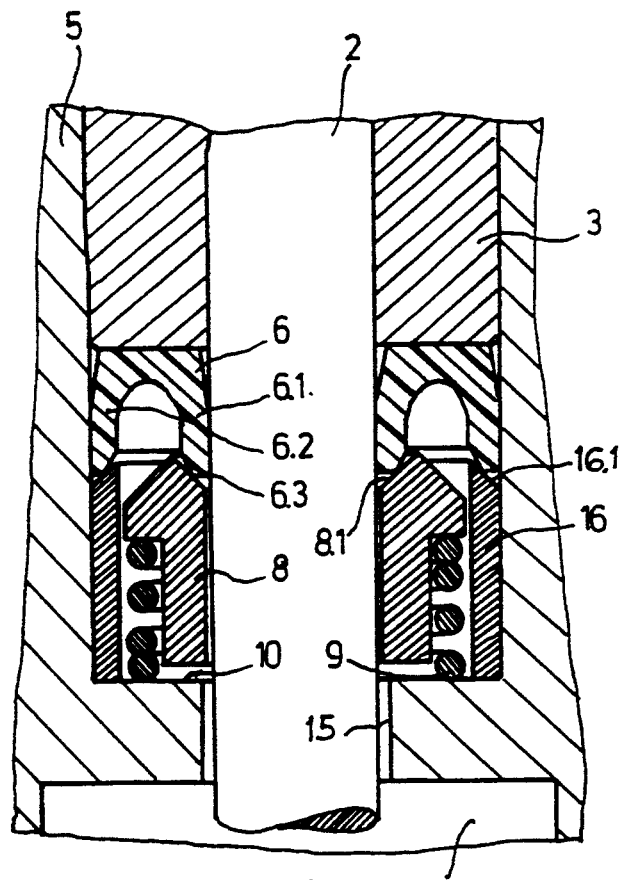
FIG. 2, the sealing arrangement according to FIG. 1, in half section, in a modified design.

Otherwise, this illustration according to FIG. 2 corresponds to the design features of FIG. 1. Here, too, a gear pump driven by an electric motor is to be shown, from the pump housing pressure side 17 of which liquid flows through the annular gap 15 of the housing 5 in the direction of the lip seal 6.

Figure 3:
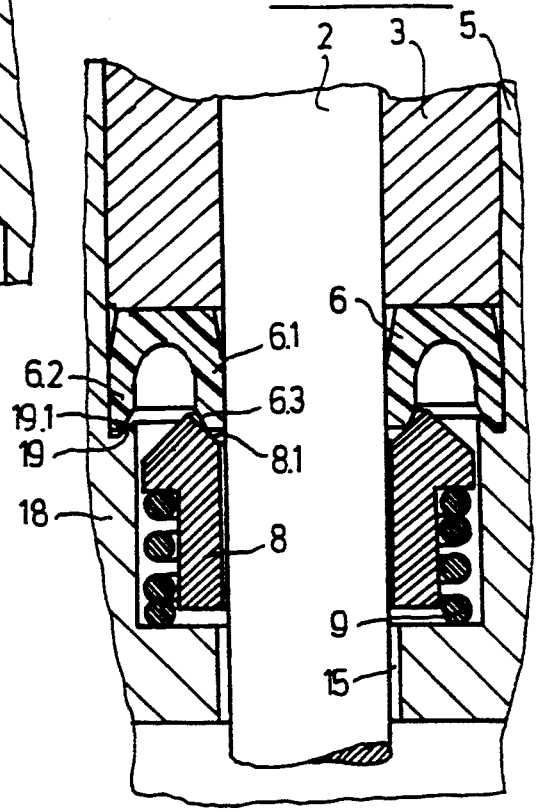
FIG. 3, the sealing arrangement according to FIG. 2, in half section and modified design.

Another version of the sealing arrangement, proven in tests, is illustrated in FIG. 3. In this embodiment, the cylinder ring 16 according to FIG. 2 has been replaced by a corresponding recess 18 in the housing. This recess 18 is constituted in that at the level of the inside edge 6.3 of the radially outer sealing lip 6.2 of the lip seal 6 there is a ring-shaped housing shoulder 19 integrally molded in place, the working surface 19.1 of which bears outwardly on the inside edge 6.3 of the lip seal 6. Here too, the working surface 19.1 is slanted at an angle of about 45° while the inside edge 6.3 is inclined at an angle of about 30° to the longitudinal axis of the shaft, so that the line contact occurs again.

The thrust part 8 with the working surface 8.1 and helical compression spring 9 corresponds to the design according to FIG. 2.

Figure 4:
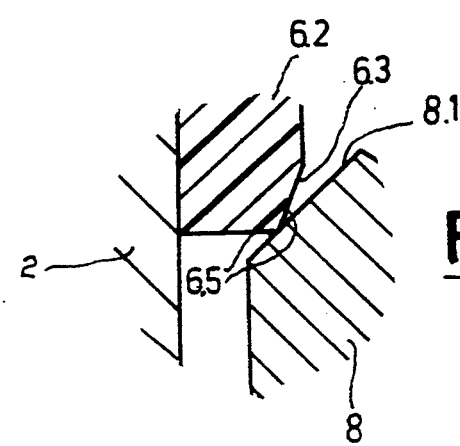
FIG. 4, a section IV in FIG. 1, in cross section.

Illustrated in FIG. 4, scaled up, is the circular section 4 according to FIG. 1. The working surface 8.1 of the thrust part 8 extends again at an angle of about 45° while the inside edge 6.3 in the end section of the radially outer sealing lip 6.2 of the lip seal 6 is shaped with an angle of 30° to the longitudinal axis of the shaft.

In a preferred embodiment of the invention, the lip seal 6 consists of plastic and may be made selectively of PTFE, Buna, neoprene, Viton or polyamide. The housing 5 may selectively consist of metal or plastic.

The lip seal 6 of PTFE can be produced by machining on an automatic lathe and features sealing lips 6.1 and 6.2 whose inside edges 6.3 inscribe an angle of 60°.

I claim:

1. Apparatus comprising a rotating shaft extending through a bore of a housing defined by a generally cylindrical wall, a motor operatively connected to said shaft, a shaft bearing surrounding said shaft and disposed between said motor and a seal assembly, said seal assembly including:

a sealing member located in said bore encircling said shaft, said sealing member having a radially inner lip contacting said shaft and a radially outer lip in contact with said bore wall, said housing including a ring-shaped shoulder surface extending inwardly from said bore wall and engaging said outer lid to thereby urge said outer lid outwardly against said bore wall;

a thrust member encircling said shaft, said thrust member having a wedge-shaped element and an integrally formed tubular portion extending from said wedge-shaped element and surrounding said shaft, said inner lip having an angled surface at an axially inner end thereof and said wedge-shaped element having an opposed angled surface at an axially outer end thereof, said angled surfaces being in contact with each other when said thrust member is urged toward said sealing member with the angle between said shaft surface and said angled surface of said wedge-shaped element being greater than the angle between said shaft surface and said angled surface of said inner lid such that said wedge-shaped element makes line contact with said inner lid; and, a coil spring surrounding said tubular portion and biasing said thrust member axially toward said sealing member to cause said wedge-shaped element to urge said inner lip radially inwardly against said shaft, said thrust member applying no substantial radially outward force to said outer lip when urged toward said sealing member by said coil spring whereby the sealing action of said inner lip is independent of the sealing action of said outer lip.

2. The apparatus of claim 1 wherein a pressurized fluid is located within said housing bore and urges said outer lip against said bore wall.

3. The apparatus of claim 1 wherein the angle between the shaft surface and said angled surface of said wedge-shaped element is approximately 45°.

4. The apparatus of claim 3 wherein the angle between the shaft surface and the angled surface of said inner lip is approximately 30°.

5. The apparatus of claim 1 wherein the angle between the shaft surface and the angled surface of said inner lip is approximately 30°.

6. The apparatus of claim 1 further including a hollow tube located inside said bore and having an axially outer edge in contact with said outer lip for urging it radially outwardly against said bore wall.

7. The apparatus of claim 6 wherein said outer lip has an inner angled surface which forms a first angle with respect to the bore wall and wherein said axially outer edge of said tube has an outer angled surface which forms a second angle with respect to said bore wall, said first angle being less than said second angle to establish line contact between said outer lip angled surface and said outer angled surface of said tube.

8. The apparatus of claim 1 wherein said sealing member is made of a material selected from the group consisting of PTFE, Viton, Buna, neoprene and polyamide.

9. The apparatus of claim 1 wherein said housing is made of a material selected from the group consisting of metal and plastic.

10. The apparatus of claim 1 wherein said shoulder surface is angled relative to said bore wall at a first angle and wherein said outer lip has an inner angled surface which forms a second angle with respect to the bore wall, and wherein said second angle is less than said first angle to establish line contact between said outer lip angled surface and said shoulder surface.

11. The apparatus of claim 1 wherein said shaft bearing maintains said sealing member within said bore and maintains said outer lip against said shoulder surface.

* * * * *

UNITED STATES PATENT AND TRADEMARK OFFICE
CERTIFICATE OF CORRECTION

PATENT NO. : 5,364,111
DATED : November 15, 1994
INVENTOR(S) : Eckart Wunsch

It is certified that error appears in the above-indentified patent and that said Letters Patent is hereby corrected as shown below:

Col. 5, line 8, "lid" should be -- lip --.

Col. 5, line 9, "lid" should be -- lip --.

Col. 5, line 27, "lid" should be -- lip --.

Col. 5, line 28, "lid" should be -- lip --.

Signed and Sealed this

Twenty-sixth Day of March, 1996

Attest:

BRUCE LEHMAN

Attesting Officer

Commissioner of Patents and Trademarks